US012567930B2

(12) United States Patent
Baker et al.

(10) Patent No.: US 12,567,930 B2
(45) Date of Patent: Mar. 3, 2026

(54) SYNCHRONIZATION RASTER BASED INDICATION OF NARROWBAND SYSTEM INFORMATION MODIFICATIONS

(71) Applicant: Nokia Technologies Oy, Espoo (FI)

(72) Inventors: Matthew Baker, Cambridge (GB); Jorma Johannes Kaikkonen, Oulu (FI); Volker Braun, Stuttgart (DE); Antti Anton Toskala, Espoo (FI)

(73) Assignee: Nokia Technologies Oy, Espoo (FI)

( * ) Notice: Subject to any disclaimer, the term of this patent is extended or adjusted under 35 U.S.C. 154(b) by 328 days.

(21) Appl. No.: 18/572,527

(22) PCT Filed: Jun. 28, 2021

(86) PCT No.: PCT/EP2021/067656
§ 371 (c)(1),
(2) Date: Dec. 20, 2023

(87) PCT Pub. No.: WO2023/274491
PCT Pub. Date: Jan. 5, 2023

(65) Prior Publication Data
US 2024/0291613 A1     Aug. 29, 2024

(51) Int. Cl.
*H04L 5/00* (2006.01)
*H04W 48/08* (2009.01)

(52) U.S. Cl.
CPC ............. *H04L 5/005* (2013.01); *H04W 48/08* (2013.01)

(58) Field of Classification Search
CPC ............... H04J 11/0073; H04J 11/0076; H04J 11/0086; H04L 5/0007; H04L 5/005; H04L 5/0053; H04L 5/0092; H04W 48/08
(Continued)

(56) References Cited

U.S. PATENT DOCUMENTS

2011/0237214 A1* 9/2011 Swarts .............. H04W 56/0035
455/226.1
2017/0208592 A1* 7/2017 Rico Alvarino ........ H04W 4/70
(Continued)

FOREIGN PATENT DOCUMENTS

EP         3471295 A1    4/2019
EP         3493455 A1    6/2019

OTHER PUBLICATIONS

Notice of Allowance received for corresponding European Patent Application No. 21737605.2, dated Mar. 27, 2025, 8 pages.
(Continued)

*Primary Examiner* — Robert J Lopata
(74) *Attorney, Agent, or Firm* — Nokia Technologies Oy

(57) ABSTRACT

Disclosed are example embodiments of method and apparatus supporting narrowband system information modification indications based on synchronization raster positions. A terminal device may comprise at least one processor and at least one memory including computer program code. The at least one memory and the computer program code may be configured to, with the at least one processor, cause the terminal device to determine a first frequency position of a synchronization signal, and apply a first scheme to decode at least a part of system information received from a network, responsive to the determined first frequency position of the synchronization signal. The first frequency position is different from a second frequency position, and the first scheme is different from a second scheme which is applicable for decoding the part of the system information when the synchronization signal is at the second frequency position.

20 Claims, 10 Drawing Sheets gNB 120

UL

DL

UE 110

(58) Field of Classification Search
USPC ......................................................... 370/329
See application file for complete search history.

(56) References Cited

U.S. PATENT DOCUMENTS

| | | | |
|---|---|---|---|
| 2019/0200307 A1* | 6/2019 | Si ........................... | H04L 5/0048 |
| 2021/0007066 A1* | 1/2021 | Lin ........................ | H04L 1/0061 |
| 2025/0016661 A1* | 1/2025 | Desai ................... | H04J 11/0076 |
| 2025/0287290 A1* | 9/2025 | Kaikkonen ........... | H04W 48/10 |

OTHER PUBLICATIONS

"3rd Generation Partnership Project; Technical Specification Group Radio Access Network; NR; User Equipment (UE) radio transmission and reception; Part 1: Range 1 Standalone (Release 17)", 3GPP TS 38.101-1, V17.1.0, Mar. 2021, pp. 1-512.
U.S. Appl. No. 63/167,864, "Channel Access for a Frequency Band", filed Mar. 30, 2021, pp. 1-72.
International Search Report and Written Opinion received for corresponding Patent Cooperation Treaty Application No. PCT/EP2021/067656, dated Mar. 30, 2022, 16 pages.
"Discussion on the change of SS block frequency position", 3GPP TSG RAN WG1 Nr Ad-Hoc#2 , R1-1710785, Agenda: 7.1.7, CMCC, Jun. 27-30, 2017, 3 pages.
"Discussion on remaining details on NR-SS", 3GPP TSG RAN WG1 Meeting 90bis, R1-1718179, Agenda: 7.1.1, NTT Docomo, Oct. 9-13, 2017, 5 pages.
"Remaining details of NR-SS", 3GPP TSG RAN WG1 Meeting NR#3, R1-1715376, Agenda: 6.1.1, ZTE, Sep. 18-21, 2017, 11 pages.
"Synchronization raster design for n100", 3GPP TSG-RAN WG4 Meeting # 102-e, R4-2206049, Agenda: 9.4.1, Nokia, Feb. 21-Mar. 3, 2022, 5 pages.
"3rd Generation Partnership Project; Technical Specification Group Radio Access Network; NR, Physical channels and modulation (Release 18)", 3GPP TS 38.211, V18.0.0, Sep. 2023, pp. 1-159.
"NR support for below 5 MHz BW", 3GPP TSG RAN WG1 #111, R1-2212397, Agenda: 9.16.1, Nokia, Nov. 14-18, 2022, 16 pages.
"Revised WID: NR support for dedicated spectrum less than 5MHz for FR1", 3GPP TSG RAN Meeting #95e, RP-220401, Agenda: 9.3.4.1, Nokia, Mar. 7-13, 2022, 5 pages.

* cited by examiner gNB 120

UL

DL

UE 110

897.5     900.5

Example band

N=749

898.95     899.05

Example 3: 3 MHz
Centre freq. at 899.0 MHz

120

210. transmit a synchronization signal at a first frequency position 220. transmit at least a part of system information using a first scheme

120

221. puncture subcarrier(s) which are used for
part of SI in the second scheme 222. config part of SI with modified payload size 223. config part of SI with modified payload
content 224. code part of SI by modified coding process 225. map part of SI to resources by modified
mapping process 321. filter out subcarrier(s) that have been punctured 322. set LLR to zero for symbols on subcarrier(s) that have been punctured 323. decode part of SI with modified payload size and content, channel coding and/or resource mapping

600

SYNCHRONIZATION RASTER BASED INDICATION OF NARROWBAND SYSTEM INFORMATION MODIFICATIONS

RELATED APPLICATION

This application claims priority to PCT Patent Application No. PCT/EP2021/067656, filed Jun. 28, 2021, and entitled "SYNCHRONIZATION RASTER BASED INDICATION OF NARROWBAND SYSTEM INFORMATION MODIFICATIONS", which is incorporated herein by reference in its entirety.

TECHNICAL FIELD

Various example embodiments described herein generally relate to communication technologies, and more particularly, to methods and apparatuses supporting narrowband system information modification indications based on synchronization raster positions.

BACKGROUND

3GPP has defined a first frequency range (FR1) including sub-6 GHz bands and a second frequency range (FR2) including millimeter wave bands for deployment of 5G New Radio (NR). In FR1, 5G NR is designed to operate with a bandwidth from 5 MHz to 100 MHz. In FR2, 5G NR is designed to operate with a bandwidth from 50 MHz to 400 MHz.

SUMMARY

A brief summary of example embodiments is provided below to provide basic understanding of some aspects of various example embodiments. It should be noted that this summary is not intended to identify key features of essential elements or define scopes of the example embodiments, and its sole purpose is to introduce some concepts in a simplified form as a preamble for a more detailed description provided below.

In a first aspect, an example embodiment of a terminal device is provided. The terminal device may comprise at least one processor and at least one memory. The at least one memory may include computer program code stored thereon. The at least one memory and the computer program code may be configured to, with the at least one processor, cause the terminal device to determine a first frequency position of a synchronization signal, and apply a first scheme to decode at least a part of system information received from a network, responsive to the determined first frequency position of the synchronization signal. The first frequency position is different from a second frequency position, and the first scheme is different from a second scheme. The second scheme is applicable for decoding the part of the system information when the synchronization signal is at the second frequency position.

In a second aspect, an example embodiment of a network device is provided. The network device may comprise at least one processor and at least one memory. The at least one memory may include computer program code stored thereon. The at least one memory and the computer program code may be configured to, with the at least one processor, cause the network device to transmit a synchronization signal at a first frequency position, and transmit at least a part of system information using a first scheme. The first frequency position is different from a second frequency position, and the first scheme is different from a second scheme. The second scheme is applicable for transmission of the part of the system information when the synchronization signal is transmitted at the second frequency position.

In a third aspect, an example embodiment of a method implemented at a terminal device is provided. The method may comprise determining a first frequency position of a synchronization signal, and applying a first scheme to decode at least a part of system information received from a network, responsive to the determined first frequency position of the synchronization signal. The first frequency position is different from a second frequency position, and the first scheme is different from a second scheme. The second scheme is applicable for decoding the part of the system information when the synchronization signal is at the second frequency position.

In a fourth aspect, an example embodiment of a method implemented at a network device is provided. The method may comprise transmitting a synchronization signal at a first frequency position, and transmitting at least a part of system information using a first scheme. The first frequency position is different from a second frequency position, and the first scheme is different from a second scheme. The second scheme is applicable for transmission of the part of the system information when the synchronization signal is transmitted at the second frequency position.

In a fifth aspect, an example embodiment of an apparatus is provided. The apparatus may comprise means for determining a first frequency position of a synchronization signal, and means for applying a first scheme to decode at least a part of system information received from a network, responsive to the determined first frequency position of the synchronization signal. The first frequency position is different from a second frequency position, and the first scheme is different from a second scheme. The second scheme is applicable for decoding the part of the system information when the synchronization signal is at the second frequency position.

In a sixth aspect, an example embodiment of an apparatus is provided. The apparatus may comprise means for transmitting a synchronization signal at a first frequency position, and means for transmitting at least a part of system information using a first scheme. The first frequency position is different from a second frequency position, and the first scheme is different from a second scheme. The second scheme is applicable for transmission of the part of the system information when the synchronization signal is transmitted at the second frequency position.

In a seventh aspect, an example embodiment of a computer program is provided. The computer program may comprise instructions stored on a computer readable medium. The instructions may, when executed by at least one processor of a terminal device, cause the terminal device to determine a first frequency position of a synchronization signal, and apply a first scheme to decode at least a part of system information received from a network, responsive to the determined first frequency position of the synchronization signal. The first frequency position is different from a second frequency position, and the first scheme is different from a second scheme. The second scheme is applicable for decoding the part of the system information when the synchronization signal is at the second frequency position.

In an eighth aspect, an example embodiment of a computer program is provided. The computer program may comprise instructions stored on a computer readable medium. The instructions may, when executed by at least one processor of a network device, cause the network device to transmit a synchronization signal at a first frequency position, and transmit at least a part of system information using a first scheme. The first frequency position is different from a second frequency position, and the first scheme is different from a second scheme. The second scheme is applicable for transmission of the part of the system information when the synchronization signal is transmitted at the second frequency position.

Other features and advantages of the example embodiments of the present disclosure will also be apparent from the following description of specific example embodiments when read in conjunction with the accompanying drawings, which illustrate, by way of example, the principles of example embodiments of the present disclosure.

BRIEF DESCRIPTION OF THE DRAWINGS

Some example embodiments will now be described, by way of non-limiting examples, with reference to the accompanying drawings.

Throughout the drawings, same or similar reference numbers indicate same or similar elements. A repetitive description on the same elements would be omitted.

DETAILED DESCRIPTION

Herein below, some example embodiments are described in detail with reference to the accompanying drawings. The following description includes specific details for the purpose of providing a thorough understanding of various concepts. However, it will be apparent to those skilled in the art that these concepts may be practiced without these specific details. In some instances, well known circuits, techniques and components are shown in block diagram form to avoid obscuring the described concepts and features.

As used herein, the term "network device" refers to any suitable entities or devices that can provide cells or coverage, through which the terminal device can access the network or receive services. The network device may be commonly referred to as a base station. The term "base station" used herein can represent a node B (NodeB or NB), an evolved node B (eNodeB or eNB), or a gNB. The base station may be embodied as a macro base station, a relay node, or a low power node such as a pico base station or a femto base station. The base station may include several distributed network units, such as a central unit (CU), one or more distributed units (DUs), one or more remote radio heads (RRHs) or remote radio units (RRUs). The number and functions of these distributed units depend on the selected split RAN architecture.

As used herein, the term "terminal device" or "user equipment" (UE) refers to any entities or devices that can wirelessly communicate with the network devices or with each other. Examples of the terminal device can include a mobile phone, a mobile terminal, a mobile station, a subscriber station, a portable subscriber station, an access terminal, a computer, a wearable device, an on-vehicle communication device, a machine type communication (MTC) device, a D2D communication device, a V2X communication device, a sensor and the like. The term "terminal device" can be used interchangeably with UE, a user terminal, a mobile terminal, a mobile station, or a wireless device.

Figure 1:
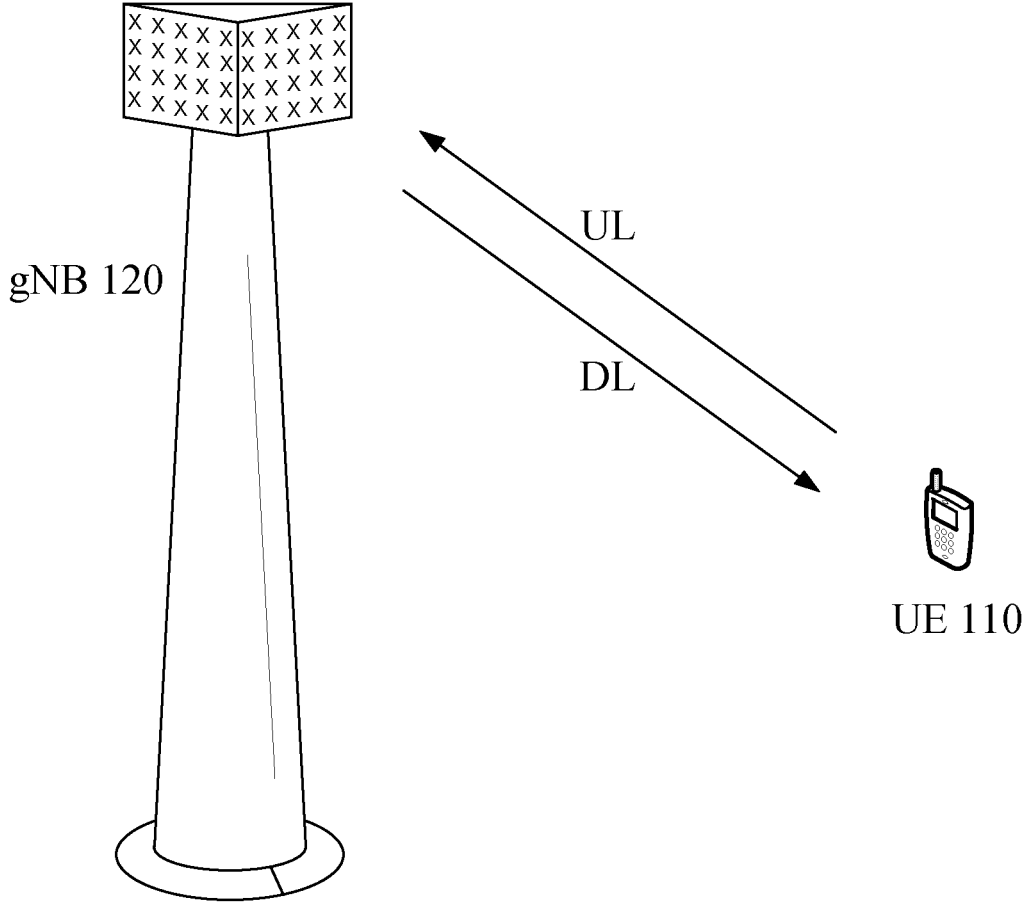
FIG. 1 is a schematic diagram illustrating an example communication network.

FIG. 1 illustrates a schematic diagram of an example communication network 100, such as a 5G NR network, in which aspects of the present disclosure may be performed. Referring to FIG. 1, the communication network 100, which may be a part of a larger network, may include a base station 120 shown as gNB and a user equipment (UE) device 110. The UE 110 may connect to the gNB 120 by performing a random access procedure and then communicate with the gNB 120 on uplink (UL) and downlink (DL) channels. Before the random access procedure, the UE 110 may perform a cell search procedure to determine which cell the UE 110 wants to connect to. Although FIG. 1 shows only one UE 110 and one network device 120, it would be appreciated that the gNB 120 may serve a plurality of UEs, and the UE 110 may wirelessly communicate with two gNBs for example in a dual connectivity (DC) scenario.

Figure 2:
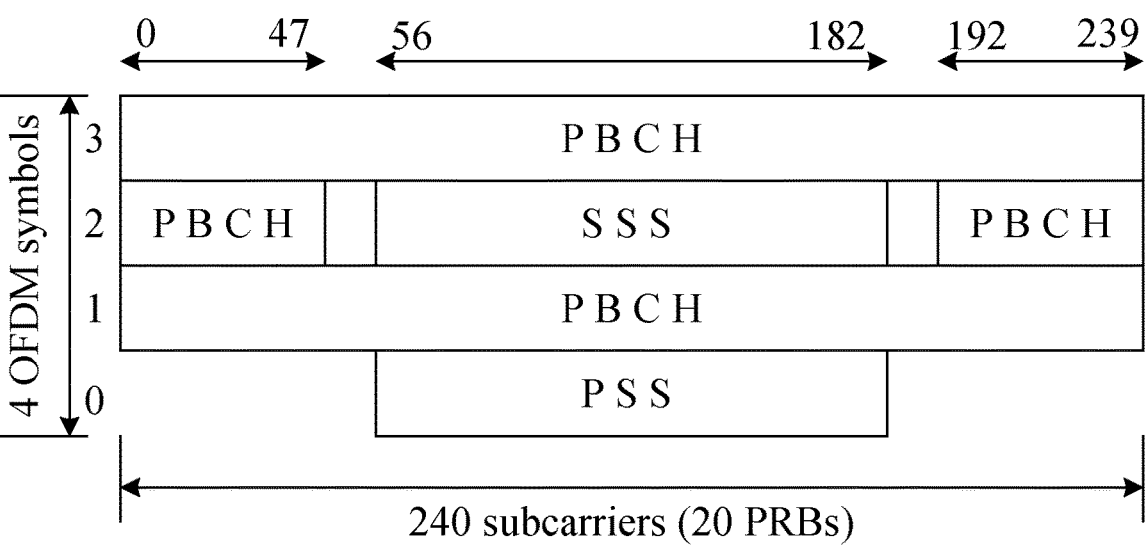
FIG. 2 is a schematic diagram illustrating an SS/PBCH block (SSB).

In the cell search procedure, the UE 110 can synchronize to a cell in time and frequency domains and read master information block (MIB) and system information blocks (SIBs). This is done through searching for a primary synchronization signal (PSS) and a secondary synchronization signal (SSS) and decoding a physical broadcast channel (PBCH) carried by an SS/PBCH block (SSB). FIG. 2 is a schematic diagram of an SS/PBCH block, showing resources for PSS, SSS and PBCH with 15 kHz subcarrier spacing (SCS). In the time domain, the SS/PBCH block occupies 4 OFDM symbols numbered from 0 to 3 where the symbol 0 is the start symbol of the SS/PBCH block. In the frequency domain, the SS/PBCH block occupies 240 subcarriers numbered from 0 to 239 where the subcarrier 0 is the start subcarrier of the SS/PBCH block. The SS/PBCH block needs at least a bandwidth of 3.6 MHz for transmission thereof. As discussed above, 5G NR is designed to operate with a minimum bandwidth of 5 MHz, which is sufficient for transmission of the SS/PBCH block.

Scenarios are emerging in which it may be beneficial to enable 5G NR operations in a narrower bandwidth than 5 MHz for which NR was originally designed. For example, deployment of NR in a FRMCS band at 900 MHz needs to take place alongside legacy GSM-R carriers within a 5.6 MHz bandwidth, which permits only about 3.6 MHz to be used for NR. In addition, there are some scenarios where only a 3 MHz bandwidth is available for NR. Referring to FIG. 2, however, the essential signals and channels for NR operations were not designed for transmission in such narrow channels.

A simple mechanism to adapt NR to narrower bandwidth is to puncture the PBCH channel but keep the synchronization signals unchanged compared to those used in the conventional NR so that the UE can synchronize to a cell in a conventional way. To successfully decode system information in a cell search procedure, the UE needs to know whether or not the PBCH channel that carries a master information block (MIB) has been punctured for a narrower bandwidth. However, the UE can neither deduce from the synchronization signals whether the PBCH channel has been punctured nor obtain bandwidth information before successfully decoding the system information. Therefore, a mechanism is still needed to inform UE of modifications to system information transmissions for NR operations in a narrow bandwidth.

Hereinafter, example embodiments of methods and apparatus capable of indicating narrowband system information modifications based on synchronization raster positions will be discussed. In the example embodiments, the network can inform UE of modifications to at least a part of system information for narrowband operations by transmitting the synchronization signals at certain synchronization raster positions. When the UE detects the synchronization signals, it will be aware of the system information modifications and applies an appropriate demodulation and/or decoding process to decode the system information, thereby enabling NR operations in a narrow bandwidth.

Similar to other radio access systems, the UE may look for synchronization signals at predefined frequency locations. For initial cell search and selection purposes, valid frequency locations for the SS/PBCH blocks may be determined by a synchronization raster. The UE uses the synchronization raster positions to look for SS/PBCH blocks and system acquisition when it has not been provided with any other information regarding the frequency location of the SS/PBCH blocks. For both frequency ranges FR1 and FR2 of 3GPP NR, a global synchronization raster is defined via a global synchronization channel number (GSCN), which is shown in the below Table 1. Referring to the Table 1, the parameter GSCN corresponds to a given frequency position $SS_{REF}$, which is the centre frequency of the SS/PBCH block, and the mapping between the GSCN and the frequency position $SS_{REF}$ depends on the frequency range. For example, for the frequency range up to 3000 MHz, the GSCN maps to absolute frequency positions in a clustered manner, i.e., locations with an offset of {50, 150, 250 kHz} at every 1.2 MHz.

Figure 3A:
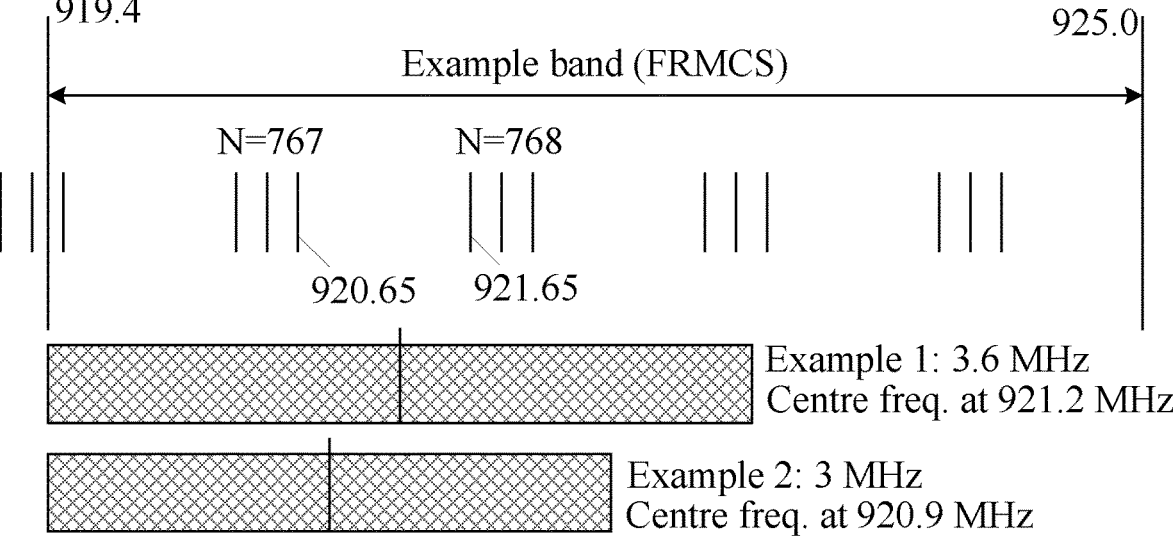
FIG. 3A is a schematic diagram illustrating an example where a default synchronization raster is not suitable for a narrowband NR carrier.
Figure 3B:
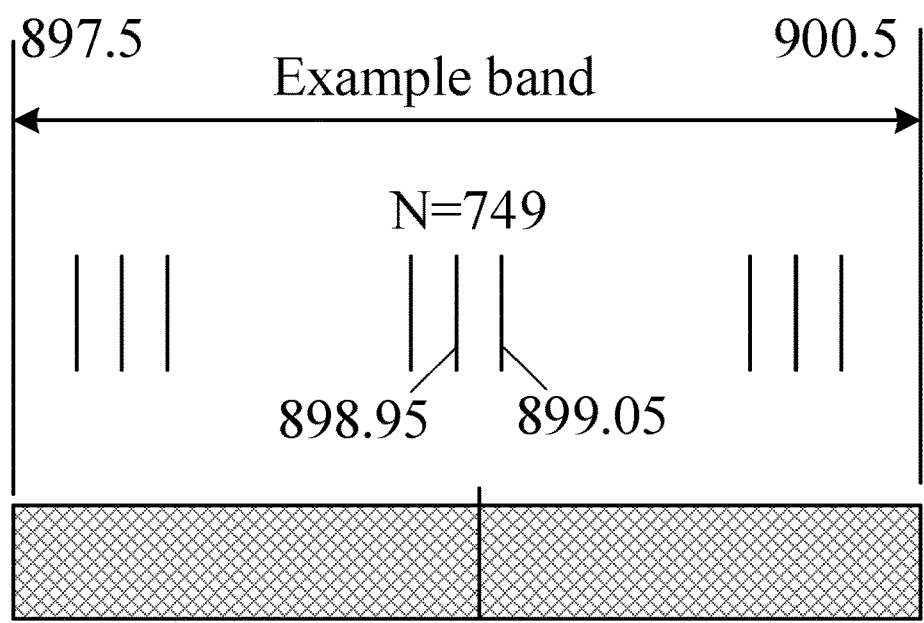
FIG. 3B is a schematic diagram illustrating another example where a default synchronization raster is not suitable for a narrowband NR carrier.

The global synchronization raster shown in the Table 1 may be used for bands that have been defined for 5G NR. In scenarios where NR is applied in a narrower bandwidth than the minimum bandwidth for which NR was designed, however, the global synchronization raster may not be suitable because the SS/PBCH block cannot necessarily be positioned at positions on the global synchronization raster. FIGS. 3A and 3B show some examples where the global synchronization raster cannot be used for narrower bands. Referring to FIG. 3A, in the FRMCS band having a 5.6 MHz bandwidth, there may be 3.6 MHz (Example 1) or 3 MHz (Example 2) available for an NR carrier, and the SS/PBCH block needs to be positioned at one edge of the FRMCS band so as to leave space for a block of GSM-R carriers at the other edge. In Example 1, the SS/PBCH block for the 3.6 MHz NR carrier has a centre frequency at 921.2 MHz. In Example 2, the SS/PBCH block for the 3 MHz NR carrier has a centre frequency at 920.9 MHz. Referring to FIG. 3B, in Example 3, the SS/PBCH block for the 3 MHz NR carrier is centrally positioned at an example bandwidth of 3 MHz with a centre frequency at 899.0 MHz. If the UE uses the global synchronization raster to search for the synchronization signals in Examples 1-3, it would end in failure because the synchronization signals are not positioned on the global synchronization raster positions.

Therefore, a new synchronization raster may be defined for synchronization signals applied in narrower bands. Hereinafter, the global synchronization raster may also be referred to as a normal or default synchronization raster to differentiate it from the new synchronization raster. Similar to the default synchronization raster that comprises a number of candidate frequency positions for applying the synchronization signals in NR bands, the new synchronization raster may comprise multiple candidate frequency positions for applying the synchronization signals in narrower bands. In the present disclosure, "narrower band" refers to a bandwidth narrower than the minimum bandwidth that has been defined for NR. The new synchronization raster may include at least one frequency position that is not included in the default synchronization raster. In some example embodiments, the new synchronization raster may be defined in a generally similar way to the default synchronization raster defined in the above Table 1, but with some modifications. For example, the new synchronization raster may be defined with certain specific N values, e.g., N={749, 767, 768, 769}, with a different multiplier of N, e.g., 1000 kHz instead of 1200 kHz, with a different multiplier of M, e.g., 10 kHz, 20 kHz or 25 kHz instead of 50 kHz, and/or with different M values, e.g., M={10, 12, 14, 16}. It would be appreciated that the specific values are provided here as examples, and the new synchronization raster is not limited in any way to these values. The new synchronization raster may have a finer frequency step size(s) than the default synchronization

TABLE 1

GSCN parameters for the global frequency raster

| Frequency Range | SS Block frequency position $SS_{REF}$ | GSCN | Range of GSCN |
|---|---|---|---|
| 0-3000 MHz | N*1200 kHz + M*50 kHz, N = 1:2499, M∈{1, 3, 5} | 3N + (M − 3)/2 | 2-7498 |
| 3000-24250 MHz | 3000 MHz + N*1.44 MHz, N = 0:14756 | 7499 + N | 7499-22255 |
| 24250-100000 MHz | 24250.08 MHz + N*17.28 MHz, N = 0:4383 | 22256 + N | 22256-26639 | raster. For example, the new synchronization raster may have a smaller multiplier of N and/or a smaller multiplier of M. A narrowband synchronization channel number may also be defined corresponding to respective frequency positions on the new synchronization raster. In some example embodiments, the new synchronization raster may be defined by new formulae that differ from the formulae for the default synchronization raster shown in the above Table 1. In some example embodiments, the new synchronization raster may be defined by a discrete set of values. In some example embodiments, the new synchronization raster may comprise a smaller frequency range than the default synchronization raster. It would also be appreciated that the new synchronization raster may be defined in any proper way as long as it can be used to position the SS/PBCH block in a desired manner within a narrower band.

Though the new synchronization raster and the default synchronization raster are described here as two synchronization rasters, it would be appreciated that in some example embodiments they can be combined into one raster. In other words, the new synchronization raster and the default synchronization raster may form different parts of one raster. The different parts of the one raster may be applied to different scenarios, e.g., the narrower bands and the NR bands.

Figure 4:
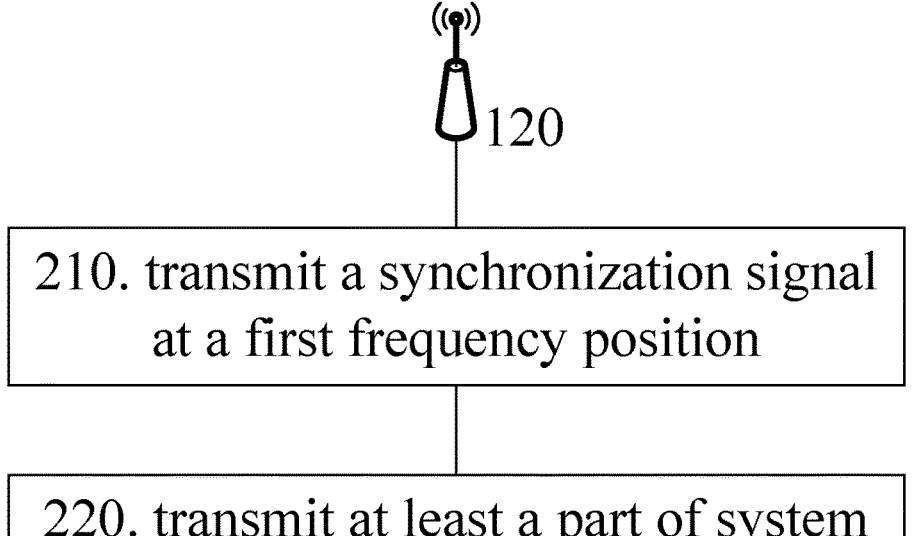
FIG. 4 is a flow chart illustrating a method implemented at a network device for transmitting system information according to an example embodiment.

As discussed above, the PBCH channel may be punctured and the system information transmitted on the PBCH channel may be modified in order to adapt NR to a narrower bandwidth. In some example embodiments, the network may implicitly inform the UE of the narrowband system information modifications by using the new synchronization raster for the synchronization signal transmissions. FIG. 4 shows a method of indicating narrowband system information modifications based on the new synchronization raster according to an example embodiment. The method shown in FIG. 4 may be performed by the gNB 120 shown in FIG. 1. In the example embodiment, the gNB 120 serves a cell with a narrower band than the bands defined for NR.

Referring to FIG. 4, at 210, the gNB 120 may transmit a synchronization signal (SS) at a first frequency position. The synchronization signal may comprise a primary synchronization signal (PSS) and/or a secondary synchronization signal (SSS). By transmitting the synchronization signal at the first frequency position, the gNB 120 informs UEs in its cell that the cell operates a narrow band. The first frequency position may be selected from frequency positions on the new synchronization raster, and it is different from frequency positions on the default synchronization raster. The new synchronization raster and the default synchronization raster have been discussed above and a repetitive description thereof is omitted here.

At 220, the gNB 120 may transmit at least a part of system information using a first scheme. The part of the system information may comprise for example a master information block (MIB) carried on the PBCH channel and/or scheduling information carried on a physical downlink control channel (PDCCH) for other system information. The MIB on PBCH may be transmitted together with the synchronization signal in an SS/PBCH block at the first frequency position. The scheduling information may comprise downlink control information broadcast on Control Resource Set 0 (CORESET0) for scheduling System Information Block 1 (SIB1).

Figure 5:
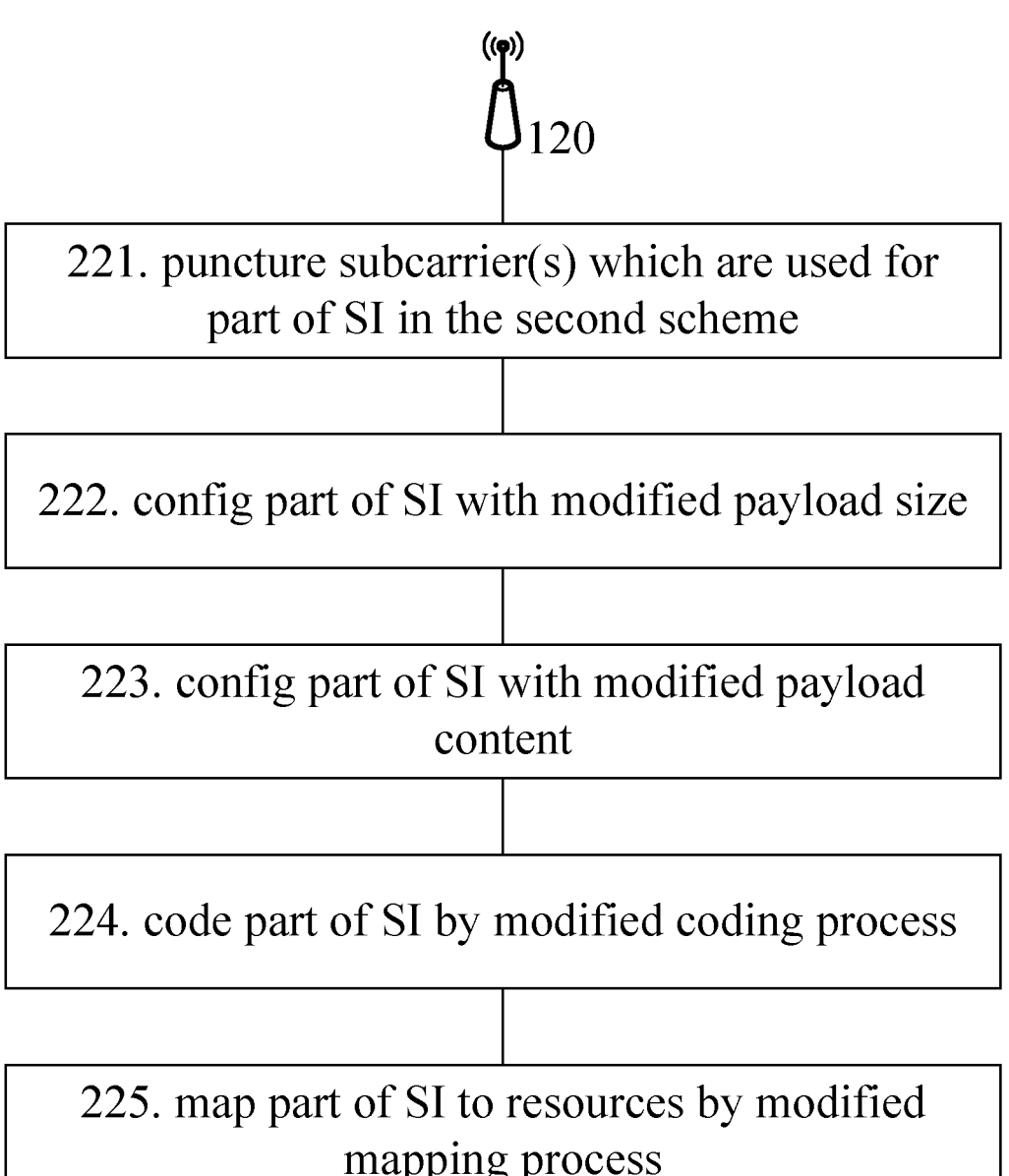
FIG. 5 is a block diagram illustrating example operations for transmitting at least a part of system information according to an example embodiment.

Here the first scheme refers to a scheme for transmitting system information for a narrower band, and it is at least partially different from a second scheme for transmitting system information for an NR band. FIG. 5 shows some example operations for transmitting the part of the system information using the first scheme. Referring to FIG. 5, at an operation 221, the gNB 120 may puncture (i.e., omit transmission of) one or more subcarriers for the part of the system information. The punctured one or more subcarriers would be used if the system information is transmitted for a normal NR band using the second scheme, but they are punctured in the first scheme because the narrow band cannot provide a sufficient channel bandwidth for transmission of the system information. The one or more subcarriers may be punctured at a lower edge, at an upper edge, or symmetrically/asymmetrically at both edges of a frequency range for system information transmission according to the second scheme. In some embodiments, the gNB 120 may determine the position and/or number of the punctured one or more subcarriers based on the first frequency position for transmission of the synchronization signal. For example, the new synchronization raster may include one or multiple candidate frequency positions. If the synchronization signal is transmitted on a first candidate frequency position, one or more subcarriers may be punctured at the lower edge of the frequency range for system information transmission according to the second scheme. If the synchronization signal is transmitted on a second candidate frequency position, one or more subcarriers may be punctured at the upper edge of the frequency range for system information transmission according to the second scheme. In some example embodiments, the gNB 120 also punctures the one or more subcarriers for transmission of reference signals, such as the demodulation reference signals (DMRSs).

At an operation 222, the gNB 120 may configure the part of the system information with a modified payload size. For example, as one or more subcarriers have been punctured, the gNB 120 may use a smaller payload size for the part of the system information so that the payload may be accommodated in the remaining subcarriers.

At an operation 223, the gNB 120 may configure the part of the system information with a modified payload content. In some example embodiments, the part of the system information may include fewer information elements (or fields) or one or more information elements having a new or modified definition, compared to the information elements included when the second scheme associated with the default synchronization raster is used. For example, when the second scheme is used, the MIB may contain an information element "ssb-SubcarrierOffset" indicating a frequency offset between the SS centre frequency and the resource block grid of the carrier, as well as a frequency offset between the SS centre frequency and the scheduling information (CORESET0) for remaining minimum system information (RMSI) carried in SIB1. In some narrowband cases, this information element may not be required as the relevant offsets may be predetermined when the synchronization signal is centered in the narrowband or the MIB coding/puncturing/mapping is tagged to the SS centre frequency as described below. In some example embodiments, the information element "ssb-SubcarrierOffset" in the NR MIB may be reused, for example to signal information about coding modifications that are applied to the CORESET0, e.g. puncturing or search space modifications. As another example, the information element "subCarrierSpacingCommon" may also be omitted because a subcarrier spacing of 15 kHz may be used for the narrowband. By using a smaller payload size and including fewer information elements for the part of the system information, the gNB 120 may mitigate or avoid the range loss caused by narrowing the bandwidth for the system information, e.g. by means of puncturing at the narrowband edges.

At an operation 224, the gNB 120 may code the part of the system information by a modified coding process. For example, the gNB 120 may use a higher coding rate for the part of the system information.

At an operation 225, the gNB 120 may map the part of the system information to resources by a modified mapping process. For example, the gNB 120 may map the part of the system information to fewer resource elements in the frequency domain. The gNB 120 may apply a predetermined frequency shift to the part of the system information relative to the synchronization signal such that the MIB carried on the PBCH may have a centre frequency different from the centre frequency of the synchronization signal or such that a frequency edge of the MIB may be aligned to a frequency edge of the synchronization signal. The gNB 120 may also extend the duration of the part of the system information in the time domain while using fewer resource blocks in the frequency domain. For example, the part of the system information may be mapped to the fifth and possibly even sixth OFDM symbol(s). In some example embodiments, the gNB 120 may modify the PDCCH mapping to CCEs from interleaved mapping to non-interleaved mapping, or change the applicable blind decoding candidates. For example, the gNB 120 may map the PDCCH channel to fewer CCE locations. In the operation 225, the gNB 120 may avoid mapping the part of the system information to subcarriers beyond the edges of the narrowband.

Some examples of the first scheme for transmitting the part of the system information have been described with reference to FIG. 5. As discussed above, the first scheme includes modifications to payload size, payload content, channel coding, subcarrier puncturing and/or resource mapping of the part of the system information. In some example embodiments, different frequency locations on the new synchronization raster, which may also be considered as different synchronization rasters, may be used to indicate different modifications to the payload size/content, channel coding, subcarrier puncturing and/or resource mapping of the part of the system information. 1. For example, two or more adjacent locations with a certain spacing may be defined in the new synchronization raster, and the number of subcarriers that are punctured in the MIB and/or CORE-SET0 may depend on and be inferred from the location corresponding to the SS centre frequency. This may, for example, be useful if it is desired to accommodate different numbers of GSM-R carriers adjacent to the NR carrier in the 5.6 MHz FRMCS bandwidth, resulting in different bandwidths being available for NR as shown in the Table 2 below. For example, referring to FIG. 3A, the NR PBCH and CORESET 0 may be predefined to allocate 15 or 18 resource blocks (RBs) in the frequency domain if the SS centre frequency is 920.9 MHz or 921.2 MHz, respectively.

TABLE 2

| Bandwidth for NR and GSM-R within FRMCS band | | | |
|---|---|---|---|
| NR | | GSM-R | |
| BW/MHz | #RBs (90% BW) | BW/MHz | #Channels |
| 4 | 20 | 1.6 | 8 |
| 3.6 | 18 | 2 | 10 |
| 3 | 15 | 2.6 | 13 |

Figure 6:
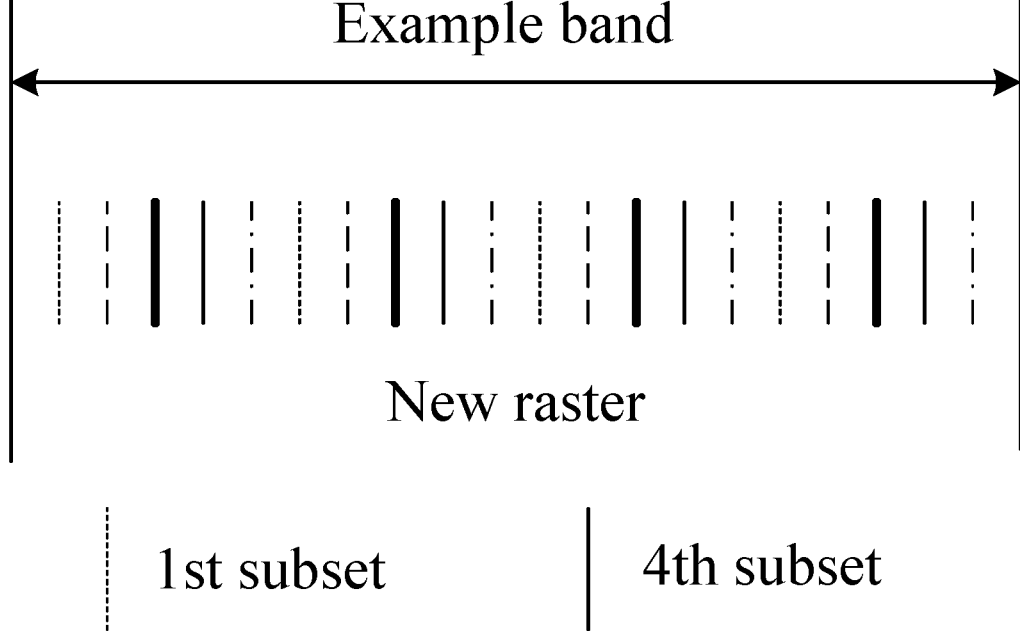
FIG. 6 is a schematic diagram illustrating an example of a new synchronization raster according to an example embodiment.

FIG. 6 shows another example where different frequency locations on the new synchronization raster indicate different modifications to the system information. Referring to FIG. 6, the new synchronization raster may include 5 subsets of frequency positions, i.e. a first subset represented by dotted lines, a second subset represented by dashed lines, a third subset represented by thick solid lines, a fourth subset represented by thin solid lines, and a fifth subset represented by dot-dashed lines. In an example, the 5 subsets of frequency positions may be interleaved and they correspond to different modifications to the system information. For example, if the SS centre frequency is located at a frequency position in the first subset, puncturing may be applied symmetrically at both edges; if the SS centre frequency is located at a frequency position in the second subset, puncturing may be applied at the lower edge; if the SS centre frequency is located at a frequency position in the third subset, puncturing may be applied at the upper edges; if the SS centre frequency is located at a frequency position in the fourth subset, puncturing may be applied 25% at the lower edge and 75% at the upper edge; if the SS centre frequency is located at a frequency position in the fifth subset, puncturing may be applied 75% at the lower edge and 25% at the upper edge. The 5 subsets of frequency positions may also, or alternatively, correspond to different modifications to number of punctured subcarrier(s), payload size, payload content, channel coding, and/or resource mapping of the system information.

Figure 7:
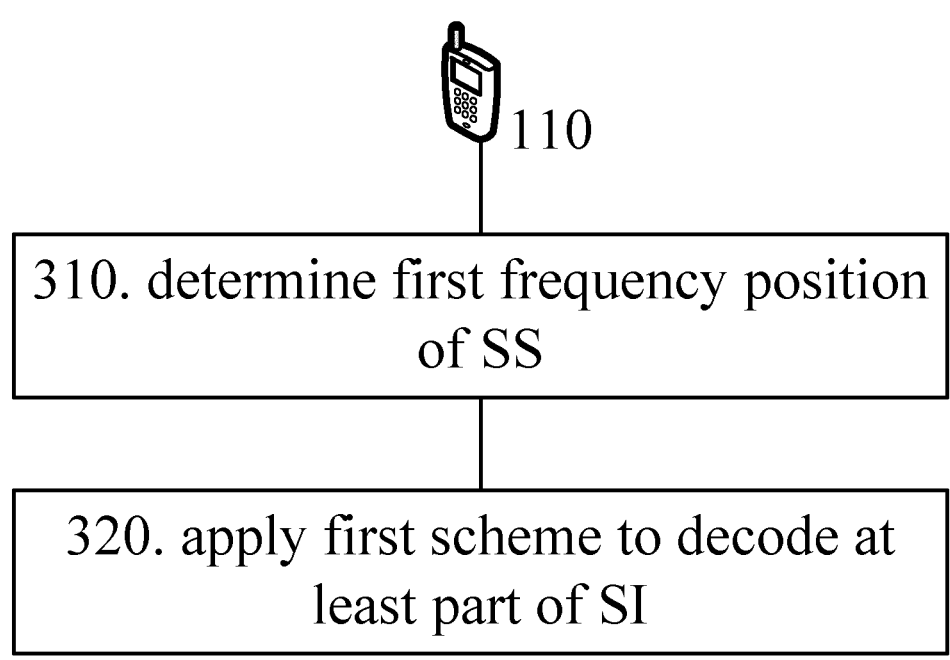
FIG. 7 is a flow chart illustrating a method implemented at a terminal device for receiving system information according to an example embodiment.

As discussed above, the gNB 120 can apply various modifications to the system information in order to adapt NR in a narrower band and indicate the modifications to UE by transmitting the synchronization signal using the new synchronization raster. On the other hand, the UE may infer the modifications from the frequency position of the synchronization signal(s) and accordingly apply a modified process to receive the system information. FIG. 7 shows a method for receiving system information according to an example embodiment. The method shown in FIG. 7 may be performed by the UE 110 shown in FIG. 1.

Referring to FIG. 7, at 310, the UE 110 may determine a frequency position of a synchronization signal, i.e. the SS centre frequency, for example in a cell search procedure. In the example embodiment, the SS centre frequency is at a first frequency position selected from the new synchronization raster and it is different from any frequency position included in the default synchronization raster. The SS centre frequency may be within a certain frequency range, e.g. 919.4-925 MHz or 897.5-900.5 MHz. If the synchronization signal has a second frequency position selected from the default synchronization raster, the UE 110 can infer that the synchronization signal is associated with a normal NR band cell and no modification is made to the system information broadcast in the cell. Then the UE 110 may apply a conventional process to receive the system information. In the example embodiment, since the synchronization signal has the first frequency position selected from the new synchronization raster, the UE 110 can infer that the synchronization signal is associated with a narrower bandwidth cell and modifications have been made to the broadcast system information. Then the UE 110 will modify its reception process accordingly to receive the system information.

At 320, the UE 110 may apply a first scheme to decode at least a part of system information received from the network, for example from the gNB 120, responsive to the determined first frequency position of the synchronization signal. The part of the system information may comprise the MIB carried on the PBCH channel and/or scheduling information carried on the PDCCH for other system information. In some example embodiments, the scheduling information may comprise DCI broadcast on CORESET0 that is used to schedule SIB1. As mentioned above, the first scheme, i.e. the modified reception process, is different from a second scheme, i.e. the conventional reception process, that is applied when the synchronization signal has the second frequency position selected from the default synchronization raster.

Figure 8:
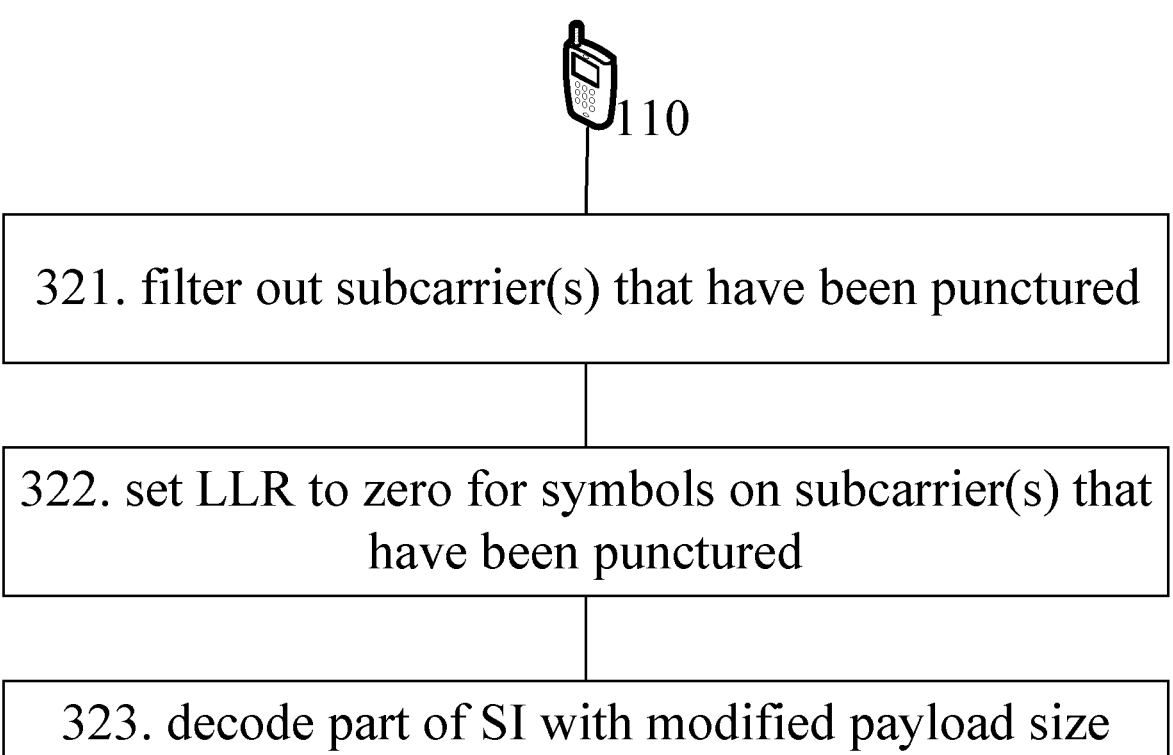
FIG. 8 is a block diagram illustrating example operations for receiving at least a part of system information according to an example embodiment.

FIG. 8 shows some example operations for receiving the part of the system information using the first scheme. From the first frequency position of the synchronization signal, the UE 110 may infer modifications made at least to the part of the system information and perform one or more operations shown in FIG. 8.

At 321, the UE 110 may filter out one or more subcarriers that have been punctured away during transmission of the part of the system information. The one or more subcarriers should have been used for system information transmission if the associated carrier has a normal NR bandwidth, but in the example embodiment, the gNB 120 has punctured the one or more subcarriers in order to adapt NR in the narrowband. The UE 110 may infer from the first frequency position of the synchronization signal which subcarriers of the part of the system information have been punctured and filter out them in decoding the system information. In some example embodiments, the UE 110 cannot know exactly which subcarriers have been punctured based on the first frequency position, and it may try decoding the part of the system information with and without one or more subcarriers to identify the punctured subcarriers. In some example embodiments, the UE 110 may also exclude reference signals e.g. DMRS on the punctured subcarriers from its channel estimation.

At 322, the UE 110 may set log-likelihood ratios (LLRs) for the symbols of the punctured subcarriers to zero in decoding the part of the system information.

At 323, the UE 110 may decode the part of the system information with modified payload size, payload content, channel coding and/or resource mapping, compared to the second conventional scheme for decoding the system information of the NR band. The UE 110 may infer the modifications that have been made to the system information from the first frequency position of the synchronization signal. For example, the UE 110 can infer the payload size and content carried on the PBCH channel, the resource elements for transmitting the PBCH channel, and information elements/fields included in the MIB carried by the PBCH channel. Then the UE 110 can use modified rules to decode resources of the PBCH channel and interpret information elements/fields included in the MIB. In an example, the UE 110 may infer how the CORESET0 transmission is modified and modify its reception of CORESET0 accordingly. In an example, the UE 110 may infer the PDCCH mapping to CCEs or the applicable blink decoding candidates and apply a corresponding rule to decode the PDCCH.

In some example embodiments, all candidate frequency positions on the new synchronization raster may correspond to same modifications to the system information. The UE 110 can infer the system information modifications by determining that the SS centre frequency is positioned on the new synchronization raster. In some example embodiments, different candidate frequency positions on the new synchronization raster may correspond to different modifications to the system information, of which an example has been discussed above with reference to FIG. 6. The UE 110 can infer the system information modifications by identifying the specific position of the SS centre frequency on the new synchronization raster, for example the N and M values for the SS centre frequency.

Figure 9:
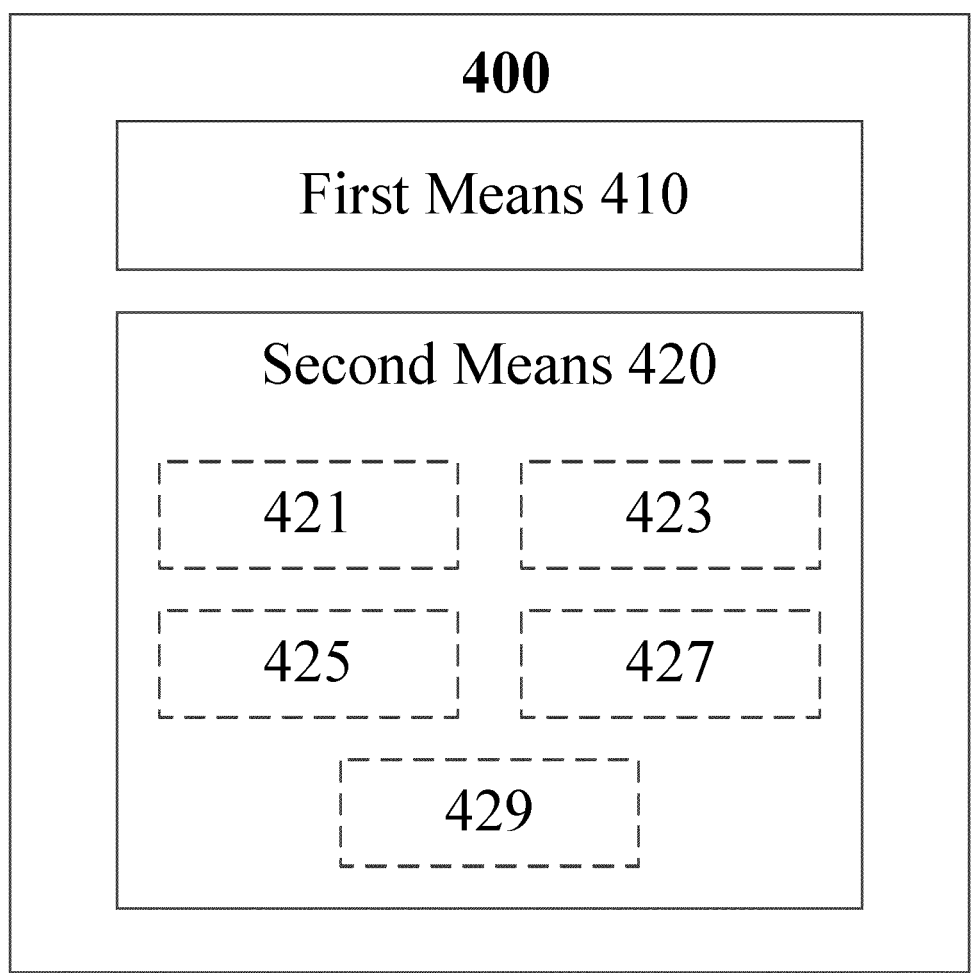
FIG. 9 is a functional block diagram illustrating an apparatus implemented at a network device according to an example embodiment.

FIG. 9 is a functional block diagram illustrating an apparatus 400 according to an example embodiment. The apparatus 400 may be implemented at or as a part of a network device such as the gNB 120 for transmitting system information of a narrowband cell. As the method for transmitting the narrowband system information has been discussed in detail with reference to FIGS. 4-6, here the apparatus 400 will be described briefly and some details would be omitted.

Referring to FIG. 9, the apparatus 400 may comprise a first means 410 for transmitting a synchronization signal at a first frequency position. The first frequency position may be selected from the new synchronization raster and it is different to any frequency positions on the default synchronization raster.

The apparatus 600 may further comprise a second means 420 for transmitting at least a part of system information using a first scheme. The first scheme is different from a second scheme that is applied for transmitting the part of the system information when the synchronization signal is transmitted at a second frequency position selected from the default synchronization raster.

In some embodiments, the second means 420 may comprise a sub-means 421 for puncturing one or more subcarriers which are used for transmission of the part of the system information when the second scheme is applied.

In some embodiments, the second means 420 may optionally comprise a sub-means 423 for configuring the part of the system information with a modified payload size.

In some embodiments, the second means 420 may optionally comprise a sub-means 425 for configuring the part of the system information with modified payload content.

In some embodiments, the second means 420 may optionally comprise a sub-means 427 for coding the part of the system information by a modified coding process.

In some embodiments, the second means 420 may optionally comprise a sub-means 429 for mapping the part of the system information to resources by a modified mapping process.

Figure 10:
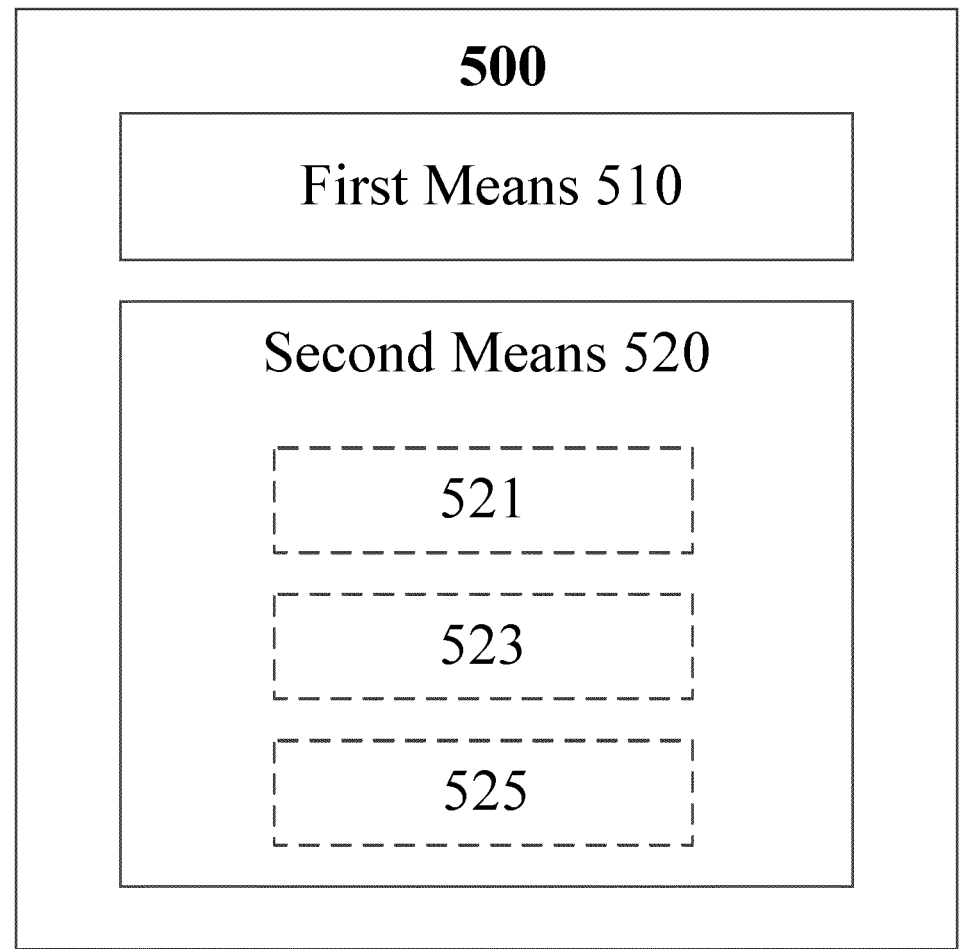
FIG. 10 is a functional block diagram illustrating an apparatus implemented at a terminal device according to an example embodiment.

FIG. 10 is a functional block diagram illustrating an apparatus 500 according to an example embodiment. The apparatus 500 may be implemented at or as a part of a terminal device such as the UE 110 discussed above for receiving system information of a narrowband. As the methods for transmitting and receiving the narrowband system information have been discussed in detail with reference to FIGS. 4-8, here the apparatus 500 will be described briefly and some details would be omitted.

Referring to FIG. 10, the apparatus 500 may comprise a first means 510 for determining a first frequency position of a synchronization signal. The first frequency position may be selected from the new synchronization raster and is different from any frequency position on the default synchronization faster.

The apparatus 500 may further comprise a second means 520 for applying a first scheme to decode at least a part of system information received from the network, responsive to the determined first frequency position of the synchronization signal. The first scheme is different from a second scheme that is applied for transmitting the part of the system information when the synchronization signal is transmitted at a second frequency position selected from the default synchronization raster.

In some example embodiments, the second means 520 may comprise a sub-means 521 for filtering out one or more subcarriers that have been punctured which are used for transmission of the part of the system information when the second scheme is applied.

In some example embodiments, the second means 520 may optionally comprise a sub-means 523 for, in decoding the part of the system information, setting log-likelihood ratios (LLRs) to zero for symbols on one or more subcarriers that have been punctured which according to the second scheme are used for transmission of the part of the system information.

In some example embodiments, the second means 520 may optionally comprise a sub-means 525 for decoding the part of the system information with modified payload size, payload content, channel coding and/or resource mapping. The modified payload size, payload content, channel coding and/or resource mapping are different from the respective payload size, payload content, channel coding and/or resource mapping according to the second scheme.

Figure 11:
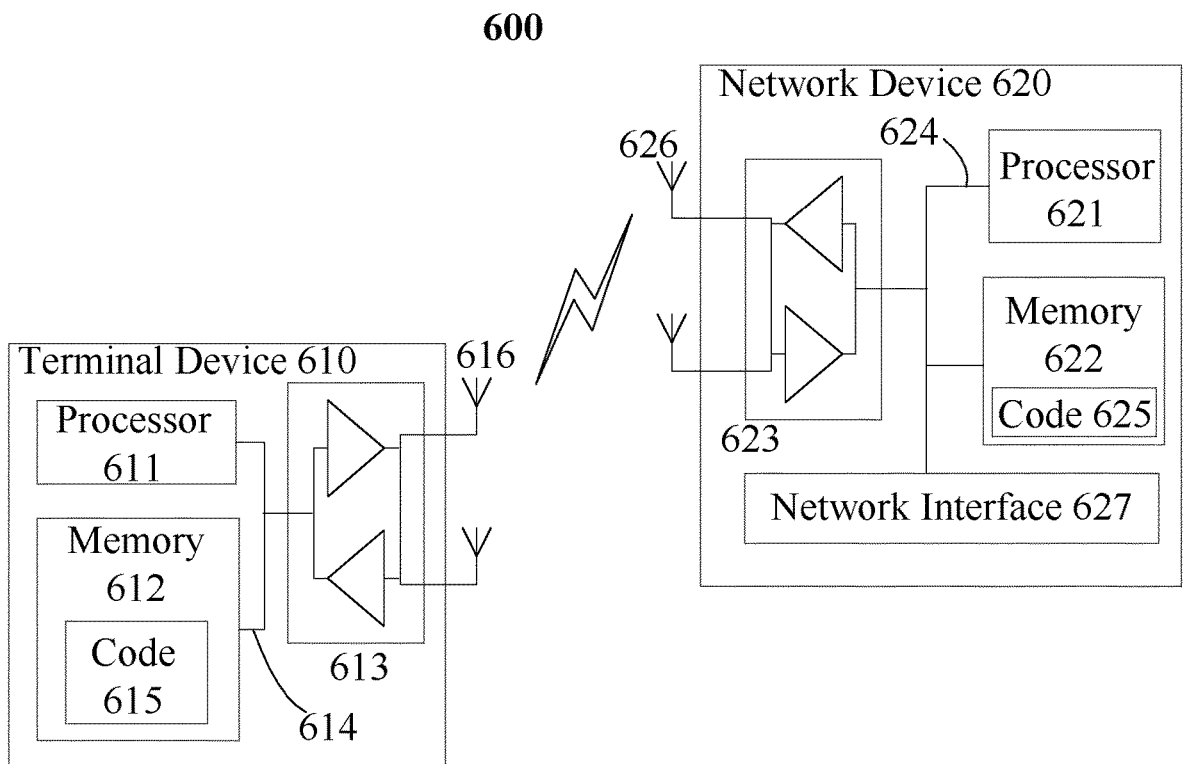
FIG. 11 is a structural block diagram illustrating a communication system according to an example embodiment.

FIG. 11 is a block diagram illustrating an example communication system 600 in which example embodiments of the present disclosure can be implemented. As shown in FIG. 11, the communication system 600 may include a terminal device 610 which may be implemented as the UE 110 discussed above, and a network device 620 which may be implemented as the gNB 120 discussed above.

Referring to FIG. 11, the terminal device 610 may comprise one or more processors 611, one or more memories 612 and one or more transceivers 613 interconnected through one or more buses 614. The one or more buses 614 may be address, data, or control buses, and may include any interconnection mechanism such as series of lines on a motherboard or integrated circuit, fiber, optics or other optical communication equipment, and the like. Each of the one or more transceivers 613 may comprise a receiver and a transmitter, which are connected to a plurality of antennas 616. The terminal device 610 may wirelessly communicate with the network device 620 through the plurality of antennas 616. The one or more memories 612 may include computer program code 615. The one or more memories 612 and the computer program code 615 may be configured to, when executed by the one or more processors 611, cause the terminal device 610 to perform operations and procedures relating to the UE 110 as described above.

The network device 620 may comprise one or more processors 621, one or more memories 622, one or more transceivers 623 and one or more network interfaces 627 interconnected through one or more buses 624. The one or more buses 624 may be address, data, or control buses, and may include any interconnection mechanism such as a series of lines on a motherboard or integrated circuit, fiber, optics or other optical communication equipment, and the like. Each of the one or more transceivers 623 may comprise a receiver and a transmitter, which are connected to a plurality of antennas 626. The network device 620 may operate as a base station for the terminal device 610 and wirelessly communicate with the terminal device 610 through the plurality of antennas 626. The one or more network interfaces 627 may provide wired or wireless communication links through which the network device 620 may communicate with other network devices, entities or functions. The one or more memories 622 may include computer program code 625. The one or more memories 622 and the computer program code 625 may be configured to, when executed by the one or more processors 621, cause the network device 620 to perform operations and procedures relating to the gNB 120 as described above.

The one or more processors 611, 621 discussed above may be of any appropriate type that is suitable for the local technical network, and may include one or more of general purpose processors, special purpose processor, microprocessors, a digital signal processor (DSP), one or more processors in a processor based multi-core processor architecture, as well as dedicated processors such as those developed based on Field Programmable Gate Array (FPGA) and Application Specific Integrated Circuit (ASIC). The one or more processors 611, 621 may be configured to control other elements of the terminal/network device and operate in cooperation with them to implement the procedures discussed above.

The one or more memories 612, 622 may include at least one tangible storage medium in various forms, such as a volatile memory and/or a non-volatile memory. The volatile memory may include but not limited to for example a random access memory (RAM) or a cache. The non-volatile memory may include but not limited to for example a read only memory (ROM), a hard disk, a flash memory, and the like. Further, the one or more memories 612, 622 may include but not limited to an electric, a magnetic, an optical, an electromagnetic, an infrared, or a semiconductor system, apparatus, or device or any combination of the above.

The network device 620 can be implemented as a single network node, or disaggregated/distributed over two or more network nodes, such as a central unit (CU), a distributed unit (DU), a remote radio head-end (RRH), using different functional-split architectures and different interfaces.

It would be understood that blocks in the drawings may be implemented in various manners, including software, hardware, firmware, or any combination thereof. In some example embodiments, one or more blocks may be implemented using software and/or firmware, for example, machine-executable instructions stored in the storage medium. In addition to or instead of machine-executable instructions, parts or all of the blocks in the drawings may be implemented, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-Chip systems (SOCs), Complex Programmable Logic Devices (CPLDs), etc.

Some example embodiments further provide computer program code or instructions which, when executed by one or more processors, may cause a device or apparatus to perform the procedures described above. The computer program code for carrying out procedures of the example embodiments may be written in any combination of one or more programming languages. The computer program code may be provided to one or more processors or controllers of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

Some example embodiments further provide a computer program product or a computer readable medium having the computer program code or instructions stored therein. The computer readable medium may be any tangible medium that may contain, or store a program for use by or in connection with an instruction execution system, apparatus, or device. The machine readable medium may be a machine readable signal medium or a machine readable storage medium. A machine readable medium may include but is not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular example embodiments. Certain features that are described in the context of separate example embodiments may also be implemented in combination in a single example embodiment. Conversely, various features that are described in the context of a single example embodiment may also be implemented in multiple example embodiments separately or in any suitable sub-combination.

Although the subject matter has been described in a language that is specific to structural features and/or method actions, it is to be understood the subject matter defined in the appended claims is not limited to the specific features or actions described above. On the contrary, the above-described specific features and actions are disclosed as an example of implementing the claims.

Abbreviations used in the description and/or in the figures are defined as follows:

BW Bandwidth
DCI Downlink Control Information
DL Downlink
DMRS Demodulation Reference Signal
gNB next Generation Node-B
GSM-R GSM-Railway
LLR Log-Likelihood Ratio
MIB Master Information Block
NR New Radio
OFDM Orthogonal Frequency Division Multiplexing
PBCH Physical Broadcast Channel
PDCCH Physical Downlink Control Channel
PLMN Public Land Mobile Network
PRB Physical Resource Block
PSS Primary Synchronization Channel
RMSI Remaining Minimum System Information
SCS Subcarrier Spacing
SI System Information
SIB System Information Block
SS Synchronization Signal
SSB Synchronization Signal/PBCH Block
SSS Secondary Synchronization Signal
UE User Equipment

What is claimed is:

1. A terminal device comprising:
at least one processor; and
at least one memory including computer program code, the at least one memory and the computer program code configured to, with the at least one processor, cause the terminal device to:
determine whether a frequency position of a synchronization signal is a first frequency position or a second frequency position, the first frequency position being different from the second frequency position; and
select a decoding scheme, responsive to the determined frequency position of the synchronization signal, the decoding scheme being selected from a first decoding scheme applicable for decoding a part of system information when the synchronization signal is at the first frequency position and a second decoding scheme applicable for decoding the part of the system information when the synchronization signal is at the second frequency position, wherein the first decoding scheme includes filtering out one or more subcarriers that have been punctured which according to the second decoding scheme are used for transmission of the part of the system information; and
apply the selected decoding scheme to decode the part of the system information received from a network.

2. The terminal device of claim 1 wherein the first frequency position is used for the synchronization signal when a carrier associated with the synchronization signal has a bandwidth smaller than a predetermined bandwidth, and the second frequency position is used for the synchronization signal when the carrier has a bandwidth larger than or equal to the predetermined bandwidth.

3. The terminal device of claim 1 wherein the first frequency position is one of frequency positions on a first synchronization raster, and the second frequency position is one of frequency positions on a second synchronization raster.

4. The terminal device of claim 3 wherein the first synchronization raster comprises at least one frequency position that is not included in the second synchronization raster.

5. The terminal device of claim 3 wherein the first synchronization raster comprises a smaller frequency range and/or a finer frequency step size than the second synchronization raster.

6. The terminal device of claim 3 wherein the first synchronization raster indicates candidate frequency positions for the synchronization signal when the carrier has a bandwidth smaller than the predetermined bandwidth, and the second synchronization raster indicates candidate frequency positions for the synchronization signal when the carrier has a bandwidth larger than or equal to the predetermined bandwidth.

7. The terminal device of claim 1 wherein the part of the system information comprises a master information block carried on a physical broadcast channel and/or scheduling information carried on a physical downlink control channel for other system information.

8. The terminal device of claim 1 wherein filtering out one or more subcarriers that have been punctured comprises determining a position and/or number of the one or more subcarriers based on the first frequency position of the synchronization signal.

9. The terminal device of claim 1 wherein applying the first decoding scheme to decode the part of system information further comprises: determining the one or more subcarriers that have been punctured by testing of decoding the part of the system information with and without one or more subcarriers ignored.

10. The terminal device of claim 1 wherein the one or more subcarriers that have been punctured are positioned at a lower edge, at an upper edge, or at both edges of a frequency range for transmission of the part of the system information according to the second scheme.

11. The terminal device of claim 1 wherein the at least one memory and the computer program code are further configured to, with the at least one processor, cause the terminal device to:

exclude reference signals on the punctured subcarriers from channel estimation.

12. The terminal device of claim 1 wherein applying the first decoding scheme comprises:

decoding the part of the system information with modified payload size, payload content, channel coding and/or resource mapping that are different from the respective payload size, payload content, channel coding and/or resource mapping according to the second scheme.

13. The terminal device of claim 12 wherein the part of the system information has a smaller payload size, includes fewer information elements, includes one or more information elements having a new or modified definition, has a higher coding rate, is mapped to fewer resource elements, is shifted in frequency relative to the synchronization signal, and/or is mapped to more time-domain resources in a case where the synchronization signal is positioned at the first frequency position than in a case where the synchronization signal is positioned at the second frequency position.

14. The terminal device of claim 1 wherein the first frequency position is one of frequency positions on a first synchronization raster, and at least one frequency position on the first synchronization raster corresponds to a different modification to payload size, payload content, channel coding, subcarrier puncturing and/or resource mapping of the part of the system information from the modification to payload size, payload content, channel coding, subcarrier puncturing and/or resource mapping to which another frequency position on the first synchronization raster corresponds.

15. A network device comprising:

at least one processor; and at least one memory including computer program code, the at least one memory and the computer program code configured to, with the at least one processor, cause the network device to:

transmit a synchronization signal at a selected frequency position, the selected frequency position being one of a first frequency position or a second frequency position, the first frequency position being different from the second frequency position; and transmit a part of system information using a selected encoding scheme, the encoding scheme being selected from a first encoding scheme applicable for transmission of a part of system information when the synchronization signal is at the first frequency position and a second encoding scheme applicable for transmission of the part of the system information when the synchronization signal is transmitted at the second frequency position, wherein the first encoding scheme punctures one or more subcarriers which according to the second encoding scheme are used for transmission of the part of the system information.

16. The network device of claim 15 wherein the first frequency position is selected for transmission of the synchronization signal when a carrier associated with the synchronization signal has a bandwidth smaller than a predetermined bandwidth, and the second frequency position is applicable for transmission of the synchronization signal when the carrier has a bandwidth larger than or equal to the predetermined bandwidth.

17. The network device of claim 15 wherein the first frequency position is one of frequency positions on a first synchronization raster, and the second frequency position is one of frequency positions on a second synchronization raster.

18. The network device of claim 17 wherein the first synchronization raster comprises at least one frequency position that is not included in the second synchronization raster.

19. The network device of claim 17 wherein the first synchronization raster comprises a smaller frequency range and/or a finer frequency step size than the second synchronization raster.

20. The network device of claim 17 wherein the first synchronization raster indicates candidate frequency positions for the synchronization signal when the carrier has a bandwidth smaller than the predetermined bandwidth, and the second synchronization raster indicates candidate frequency positions for the synchronization signal when the carrier has a bandwidth larger than or equal to the predetermined bandwidth.

* * * * *